July 27, 1948.　　　　W. A. TYRRELL　　　　2,445,895
COUPLING ARRANGEMENT FOR USE IN
WAVE TRANSMISSION SYSTEMS
Filed Dec. 31, 1942　　　　　　　　　　10 Sheets-Sheet 1
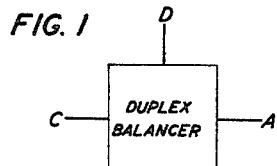
FIG. 1
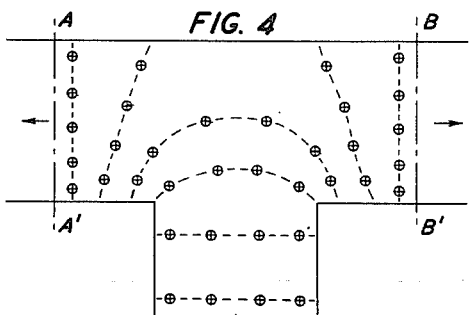
FIG. 4
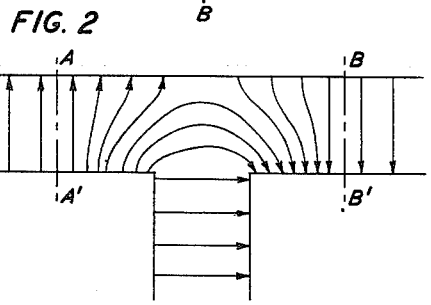
FIG. 2
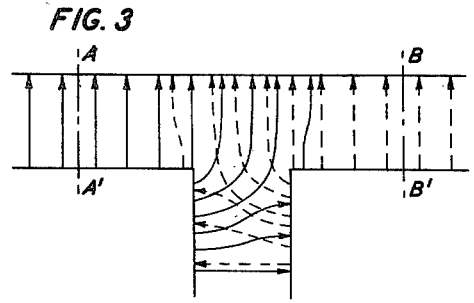
FIG. 3
FIG. 5
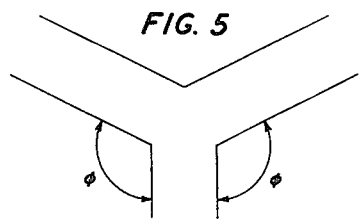
FIG. 6
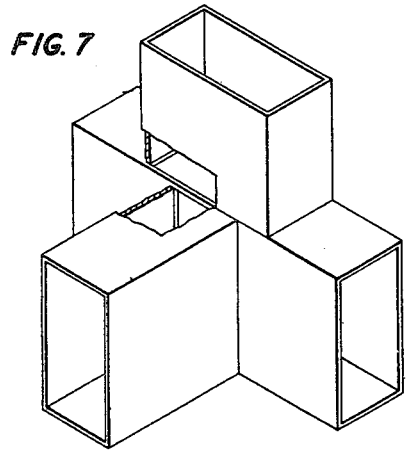
FIG. 7
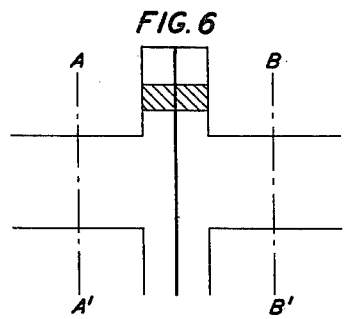
FIG. 8
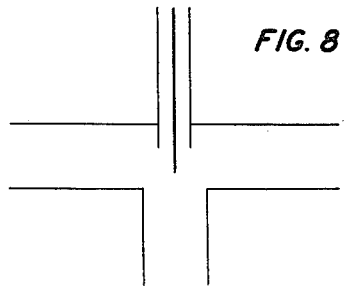
INVENTOR
W. A. TYRRELL
BY
*Earl C. Laughlin*
ATTORNEY July 27, 1948.    W. A. TYRRELL    2,445,895
COUPLING ARRANGEMENT FOR USE IN
WAVE TRANSMISSION SYSTEMS
Filed Dec. 31, 1942    10 Sheets-Sheet 2

INVENTOR
W. A. TYRRELL
BY
Earl C. Laughlin
ATTORNEY

July 27, 1948.  W. A. TYRRELL  2,445,895
COUPLING ARRANGEMENT FOR USE IN
WAVE TRANSMISSION SYSTEMS
Filed Dec. 31, 1942  10 Sheets-Sheet 3

INVENTOR
W. A. TYRRELL
BY
Earl C. Laughlin
ATTORNEY

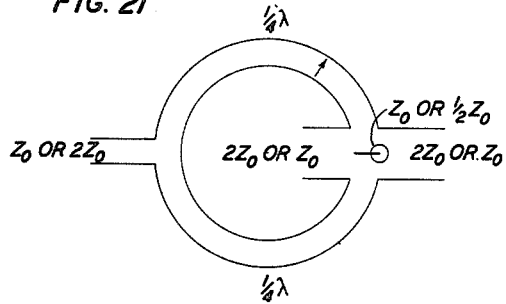
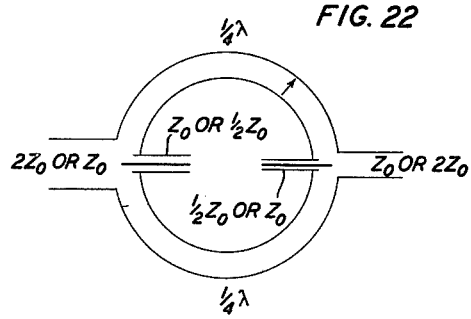
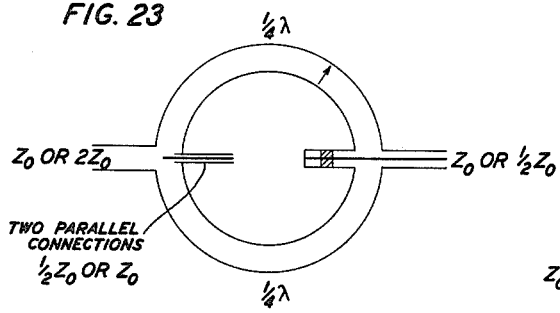
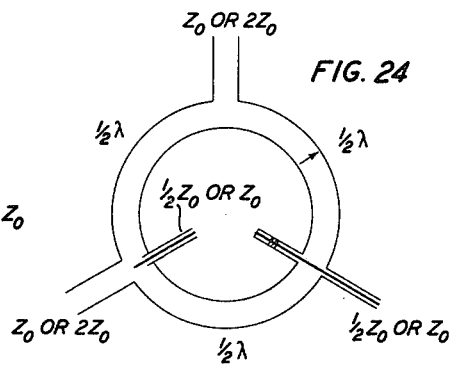
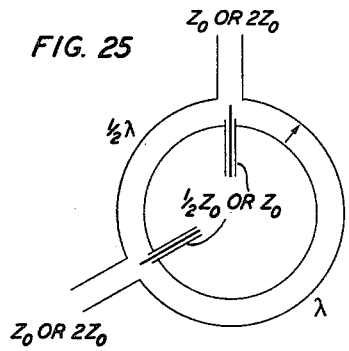
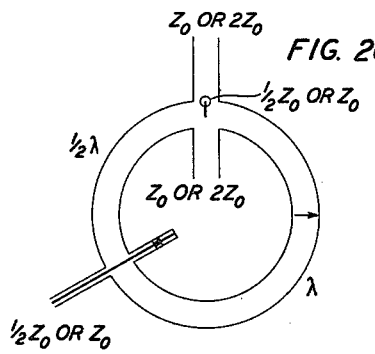

July 27, 1948.　　　　W. A. TYRRELL　　　　2,445,895
COUPLING ARRANGEMENT FOR USE IN
WAVE TRANSMISSION SYSTEMS
Filed Dec. 31, 1942　　　　　　　　　　　10 Sheets-Sheet 5
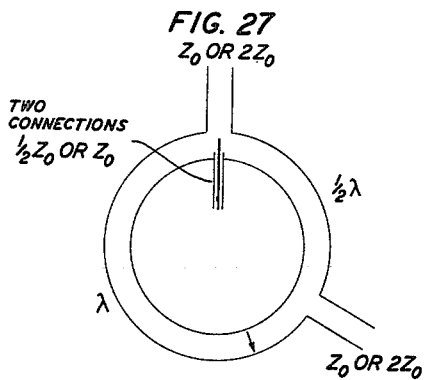
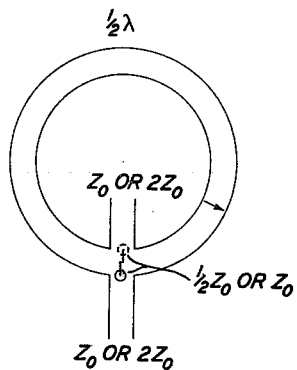
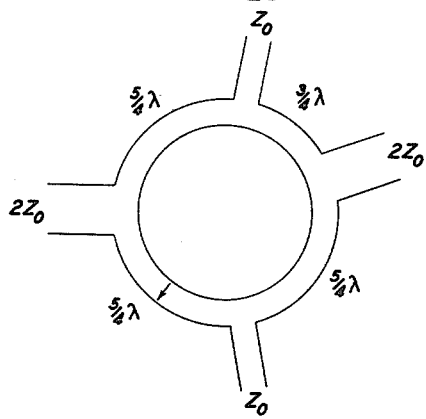
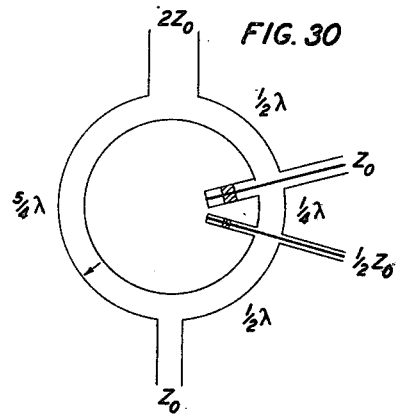
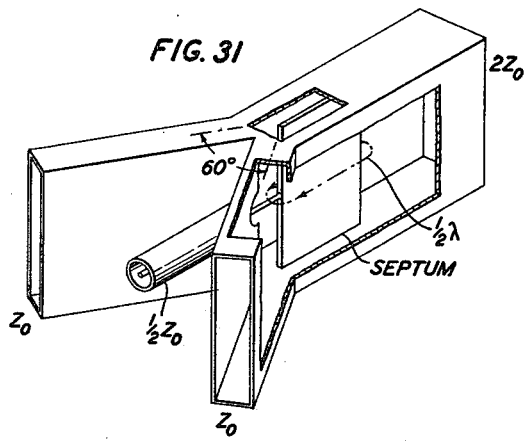
INVENTOR
W. A. TYRRELL
BY
Earl C. Laughlin
ATTORNEY July 27, 1948.  W. A. TYRRELL  2,445,895
COUPLING ARRANGEMENT FOR USE IN
WAVE TRANSMISSION SYSTEMS
Filed Dec. 31, 1942  10 Sheets-Sheet 6

INVENTOR
W. A. TYRRELL
BY
ATTORNEY

July 27, 1948.  W. A. TYRRELL  2,445,895
COUPLING ARRANGEMENT FOR USE IN
WAVE TRANSMISSION SYSTEMS
Filed Dec. 31, 1942  10 Sheets-Sheet 8

FIGS. 44-49 INCLUSIVE:
( $R_1 = Z_0$ OR $2Z_0$, $R_2 = 2Z_0$ OR $Z_0$, $R_3 = Z_0$ OR $\tfrac{1}{2}Z_0$, $R_4 = \tfrac{1}{2}Z_0$ OR $Z_0$ )

INVENTOR
W. A. TYRRELL
BY
Earl C. Laughlin
ATTORNEY

INVENTOR
W. A. TYRRELL
BY
*Earl C. Laughlin*
ATTORNEY

INVENTOR
W. A. TYRRELL
BY
*Earl C. Laughlin*
ATTORNEY

Patented July 27, 1948

2,445,895

UNITED STATES PATENT OFFICE 2,445,895

COUPLING ARRANGEMENT FOR USE IN WAVE TRANSMISSION SYSTEMS

Warren A. Tyrrell, Fairhaven, N. J., assignor to Bell Telephone Laboratories, Incorporated, New York, N. Y., a corporation of New York Application December 31, 1942, Serial No. 470,810

13 Claims. (Cl. 178—44)

The invention relates to wave transmission systems and particularly to coupling arrangements for use in such systems.

An object of the invention is to provide efficient transmission of wave power between certain of a plurality of wave transmission lines or other media in a wave transmission system while effectively preventing transmission of wave power between others of them.

Another object is to provide balance in systems involving wave motion.

A related object is to provide with simple and economical apparatus an extremely accurate balance between certain parts of a wave transmission network to prevent wave transmission therebetween, and a given amount of unbalance between other parts of the network to facilitate wave transmission therebetween.

A more specific object is to so couple four transmission lines or other transmission media that when wave power is supplied to any one of them two others of the lines will receive part of this power while the fourth line will receive no power.

In general, these objects are attained in accordance with the invention in the following manner. A coupling device consisting of a transmission line or circuit, or equivalent circuit with lumped circuit constants which may comprise coupled electrical networks, connected in a closed loop or ring of suitable dimensions is used. The four individual lines or circuits between which wave transmission at a given frequency is to be respectively prevented or allowed, are connected as branches to the transmission loop or ring at different points. The types of electrical connections of the several branches with the transmission loop or ring are so selected, and the electrical spacing of the branches around the loop or ring or the equivalent line wave-lengths of the lumped constant circuit portions between adjacent branches around the loop, and the characteristic impedances of the branches with respect to that of the transmission loop or ring are proportioned to provide electrical balance with impedance matching at a given frequency between certain of the four branches and a desired amount of unbalance between others of them. Thus, if wave power of the given frequency is applied to the loop through any one of the branches, a desired distribution of transmitted wave power between the other branches may be obtained.

In one basic embodiment of the invention, electrical balance independent of frequency between each two transmission branches connected to oppositely situated portions of the closed transmission loop, and electrical unbalance between each two adjacently connected transmission branches around the loop, are attained mainly by the use of dissimilar electrical connections (one series and one parallel) for two oppositely situated branches, and similar electrical connections (both series or both parallel) for the other two oppositely situated branches.

In another basic embodiment of the invention, electrical balance at given frequencies between each two transmission branches connected to oppositely situated portions of the transmission loop and electrical unbalance at these frequencies between each transmission branch and each adjacently connected transmission branch around the loop, are attained by providing between each two oppositely situated (non-adjacent) transmission branches two electrical paths around the loop differing in effective electrical length by a half wave-length.

These basic embodiments and various modifications thereof in accordance with the invention, employing wave guide, coaxial cable, shielded pair cable (parallel wire line), coupled electrical networks with lumped constants, or combinations of them, for the coupling loop and the transmission branches, and various combinations of electrical connections with the transmission loop for the several transmission branches with appropriate electrical spacings between them, and appropriate ratios of characteristic impedance of the branch lines with respect to that of the coupling loop, to provide impedance matching, are described in detail in the following description and are illustrated in the accompanying drawings in which:

Fig. 1 is a simple diagram used in connection with a general description of the invention;

Figs. 2 to 11, inclusive, show sectional, cross-sectional or perspective views of different arrangements for combining wave guides or wave guides and coaxial lines to provide series and parallel connections such as are used in the arrangements of the invention;

Figure 52:
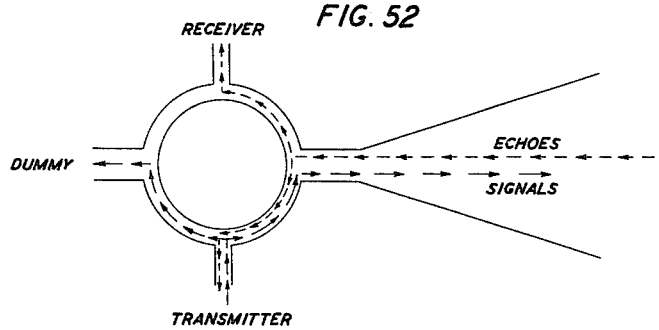
Figure 53:
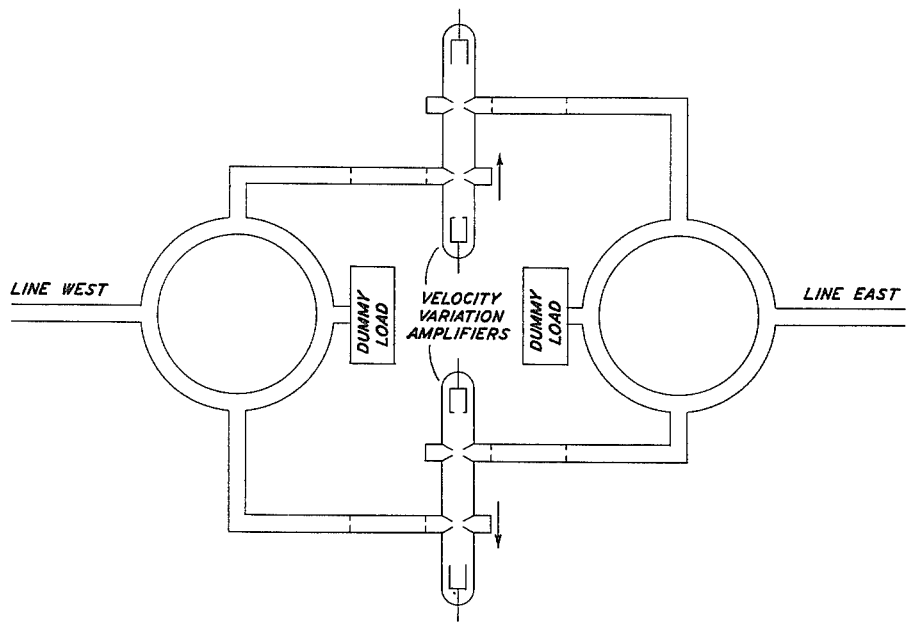
Figure 54:
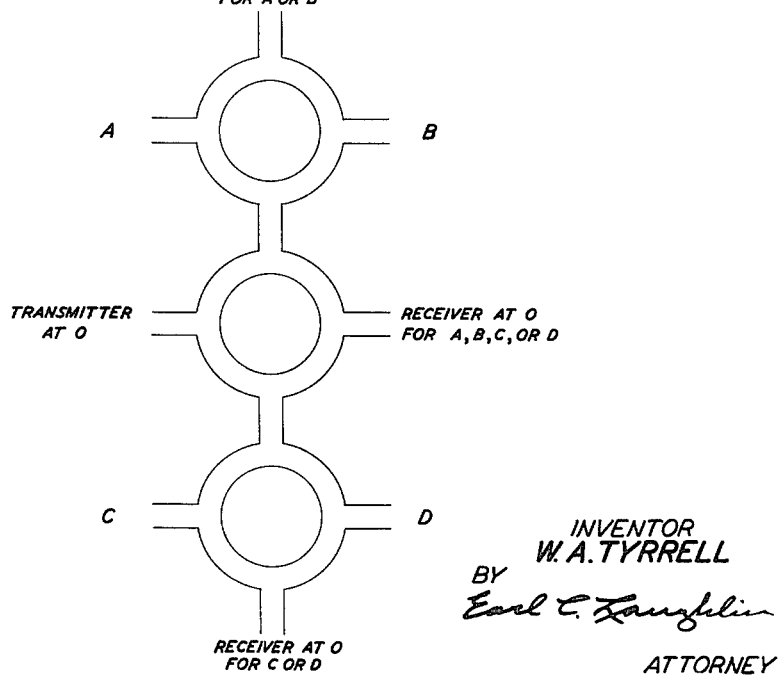

Figs. 16 to 31, inclusive, show perspective or cross-sectional views of other coupling or balancing arrangements in accordance with the invention employing wave guides and coaxial lines in combination, and different combinations of series and parallel connections of the branch lines to the coupling loop;

Figs. 32 to 37 show plan views of other coupling or balancing arrangements in accordance with the invention in which the coupling loop or ring is of coaxial cable and the coupled branch lines are of coaxial cable or of shielded pair (parallel wire) line;

Figs. 38 to 43 show plan views of other coupling or balancing arrangements in accordance with the invention in which the coupling ring or loop and the branch lines comprise shielded pair lines;

Figs. 44 to 49 inclusive, show other coupling or balancing arrangements in accordance with the invention in which the coupling ring or loop comprises circuits with lumped constants;

Figs. 50 to 53 show the application of the coupling or balancing arrangements in accordance with the invention to wire line and radio duplex communication systems, a system of object location and a duplex repeater; and Fig. 54 shows diagrammatically how a plurality of the coupling or balancing arrangements in accordance with the invention may be combined to form multiple duplex balancers.

The scope of the principles determining the operation of the devices of the invention is so general as to embrace other forms of wave motion, and limits to the application of the devices would seem, therefore, to be set mainly by the dictates of practical construction. For purposes of simplification and brevity the following detailed description will be limited to such devices in connection with alternating current transmission, and to a few of the more important of the many possible applications of such use.

As all of the devices of the invention operate by providing wave balance and are of primary utility for use in duplex communication systems in which they render possible simultaneous two-way communication at the same frequency, for convenience in the following description they will be referred to by the general term "duplex balancer," but it is to be understood that the term where used in the description and in some of the claims should be given a broad interpretation not limited to duplex systems.

The constructions of the invention to be described employing hollow metal wave guides, coaxial cable, and shielded wire line or combinations thereof are particularly adapted for use with systems transmitting waves of ultra-high frequencies, and those employing circuits with lumped constants, i. e., coil-condenser networks, are particularly adapted for use with systems transmitting relatively low frequency waves.

The device of the invention will be described in general terms with reference to the simple diagram of Fig. 1. In that figure, the device is represented as a box the nature of the contents of which is irrelevant to a general description, but it is to be understood that the contents are such as to bring about the results outlined below. Emerging from the box are four "leads" identified as A, B, C and D. A lead may be composed of wave guide, coaxial cable, shielded pair, a pair of wires, or whatever is appropriate to the frequency involved. If a generator is connected to lead A, and if balance has been obtained and suitable loads are attached to the other three leads, the power from the generator will be evenly divided between the loads at B and D, and no power will be developed in the load at C. Also, if the generator is connected to B, the power will divide equally between suitable loads at A and C, and no power will flow to a load at D. In one application of such a device, a signal transmitter may be connected to lead A, a dummy load to the lead D, a signal receiver to lead C, and a communication line to lead B. The receiver will be unaffected by power flowing from the transmitter to the line and to the dummy load, but the receiver will be responsive to power arriving over the communication line.

Inasmuch as the use of hollow metal wave guides in certain constructions of the invention require special connections and involve operations considerably different from those of the constructions employing coaxial cable, parallel wire lines or electrical networks, it appears desirable at this point to discuss some of the fundamentals of wave guide transmission and construction.

Wave guide fundamentals

From the infinite number of possible wave types which may be propagated in hollow metal wave guides, the dominant wave will be selected for sole consideration. The dominant wave is the wave of lowest critical frequency, and the most effective general argument in favor of its use, is that, by using a frequency intermediate between the critical frequencies of the dominant wave and of the next higher order wave, only the dominant wave can be propagated, and hence a confusing mixture of wave types, generated by discontinuities and imperfections in the wave guide constructions, is avoided. For this reason, it is likely that the restriction to the dominant wave will result in the simplest and most efficient forms of wave guide duplex balancer. However, there seems to be no fundamental reasons why the other types of waves may not be used.

Wave guides of either circular or rectangular cross section are available. The rectangular wave guide possesses superiority for many purposes due to the fact that, if one dimension of the cross section is sufficiently small, the dominant waves can be propagated with only one polarization, i. e., with the electric intensity parallel to the short side. In the constructions of the invention, therefore, the use of rectangular wave guides is favored.

Also, a knowledge of some of the fundamentals concerning wave guide branching is imperative for a proper understanding of the operation of wave guide duplex balancers. The most general case of such branching is quite complicated, but there are certain special cases referred to below which may be analyzed in a qualitative manner. Consider, for example, Fig. 2, which depicts a straight piece of rectangular wave guide, to which, at right angles, another rectangular guide has been joined in the electric plane, i. e., in the plane parallel to the lines of electric intensity of both guides. In Fig. 2, the lines of electric intensity are shown drawn according to Huygens' principle to indicate qualitatively the behavior when dominant waves are sent toward the junction of the two guides from the perpendicular arm. Although there may be some reflection at the junction, it will be seen that the "transmitted power" is equally divided between the two collinear arms, and that, if the cross sections AA' and BB' are equidistant from the junction, the waves at AA' are 180 degrees out of phase with the waves at BB'.

Fig. 3 shows the same branching scheme as Fig. 2, in which the solid lines within the guides represent the electric intensities of waves arriving from the left and the broken lines the electrical intensities for waves arriving from the right, in the two collinear sections. It is seen that, if the two sets of waves are in phase at AA' and BB', the perpendicular arm receives waves which are 180 degrees out of phase. If, then, the magnitudes of the two original wave trains are equal, the waves in the side arm branch cancel identically, and that branch receives no power. Such trains of waves of equal amplitude traveling in opposite directions create, of course, standing waves with a voltage loop at the junction. In order words, a perpendicular side arm "plugged-in" in the electric plane at a voltage maximum of a standing wave will receive no power.

Fig. 4 shows a junction of wave guides in the magnetic plane, i. e., in the plane parallel to the lines of magnetic intensity and, therefore, perpendicular to the lines of electric intensity indicated by the small circles. Lines of electric intensity are indicated for waves proceeding toward the junction from the side arm branch. Since here the geometry does not act to reverse the polarity of the lines of force, the waves crossing AA' are in phase with those crossing BB' and, moreover, for waves of equal amplitude proceeding from the left and from the right, in phase as they cross AA' and BB', respectively, the side arm branch will receive waves which are all in phase and will thus receive maximum power. In other words, the side arm receives maximum power when plugged in at what would otherwise be a voltage maximum of a standing wave.

In order for the foregoing statements regarding branching in electric and magnetic planes to be true, it is not necessary that the two wave guide arms be collinear. It is, however, necessary that the branching be symmetrical with respect to the side arms. Fig. 5 indicates such symmetrical branching where the wave guide arms are not collinear.

From analogy with conventional transmission line connections, the arrangement of Fig. 2 may be identified as a series connection of the side arm to the "main guide," and that of Fig. 4 as a parallel connection, on account of the phase relationships which prevail. In the following description, the arrangement of Fig. 2 and that of Fig. 4 with the generalization permitted in Fig. 5, will be called a series connection and a parallel connection, respectively.

Fig. 6 shows an appropriate construction for effecting branching with a combination of wave guides and coaxial cable. Power delivered from the coaxial line, shown diagrammatically at the center of the figure, proceeds to the right and to the left with a 0-degree difference in phase between the waves crossing AA' and BB'. Conversely, for waves of equal amplitude traveling to the right and left in the wave guide, the coaxial cable will receive maximum power if the waves traveling to the right cross AA' in phase with those moving in the opposite direction, crossing BB'. A comparison of this behavior with that found in the arrangement of Fig. 4 shows that the arrangement of Fig. 6 may also, at least from phase considerations, be termed a parallel connection of a coaxial line to a wave guide. There are several other ways of establishing a connection of a coaxial cable to a wave guide. For example, the inner coaxial conductor need extend only part of the way across the guide, or it may terminate, within the guide, in a suitable antenna the other end of which is connected back to the outer coaxial conductor. The connection might even be made in the magnetic plane, provided that the inner coaxial conductor terminates in some arrangement capable of receiving the wave guide power. It is to be emphasized, therefore, that although the configuration shown in Fig. is most often used for schematic illustration in this application, there are other methods of establishing connection between coaxial cable and wave guide which may be more suitable in specific applications.

The significant facts about the above referred to special branching cases may be summarized as follows:

1. A generator in a perpendicular or symmetrical side arm of a wave guide sends waves into the two other arms which are 180 degrees out of phase if the side arm is connected in series with the other two arms. Such a series connection involves branching in the electric plane, as shown in Fig. 2 (or as generalized in Fig. 5).

2. A generator in a perpendicular or symmetrical side arm of a wave guide sends waves into the two other arms which are in phase if the side arm is connected in parallel with the other two arms. Such a parallel connection involves branching in the magnetic plane, as shown in Fig. 4 (or as generalized in Fig. 5), or involves connection with coaxial line, as shown in Fig. 6

3. A symmetrical series connection to a wave guide containing a standing wave will receive no power if it is connected at a voltage maximum and will receive maximum power if it is connected at what would otherwise be a voltage node.

4. A symmetrical parallel connection to a wave guide containing a standing wave will receive no power if it is connected at a voltage node and will receive maximum power if it is connected at what would otherwise be a voltage maximum.

As will be pointed out later, there may be cases where it is necessary to establish two, three, or four connections to a wave guide at the same point. In regard to the superposition of two connections, only the case of one series and one parallel connection is of interest for duplex balancers. Fig. 7 shows a way of making such connection with two wave guides joined to the main guide; the series connection takes place in the electric planes, while the parallel connection is made in the magnetic plane. Fig. 8 shows another way to establish the superposed connection in which coaxial cable is used for the parallel connection. On account of the presence of the wave guide series branch, it is not possible to use the exact arrangement of Fig. 6, and so one of the alternative schemes already mentioned is employed. The particular scheme indicated in Fig 8 provides for tuning by the variable extension of the inner coaxial conductor across the wave guide.

The various general configurations of principal interest for cases of three and of four superposed connections to a main guide are summarized in the following table:

*Method of establishing connections*

|  | Series | Series | Parallel | Parallel |
|---|---|---|---|---|
| Three Connections: | | | | |
| a | Wave Guide | Wave Guide | Wave Guide | Wave Guide. |
| b | ----do---- | ----do---- | ----do---- | |
| c | ----do---- | Wave Guide | Coaxial | |
| d | ----do---- | | Wave Guide | Coaxial. |
| e | ----do---- | | Coaxial | Do. |
| Four Connections: | | | | |
| f | ----do---- | Wave Guide | Wave Guide | Wave Guide. |
| g | ----do---- | ----do---- | ----do---- | Coaxial. |
| h | ----do---- | ----do---- | Coaxial | Do. |

Figure 9:
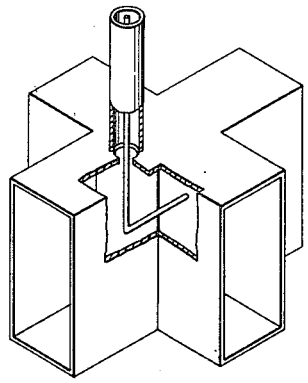
Figure 10:
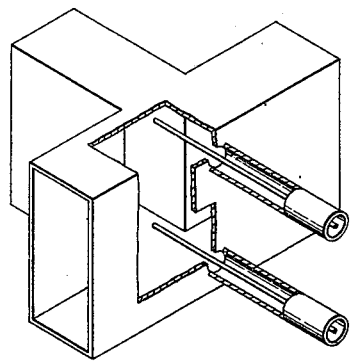
Figure 11:
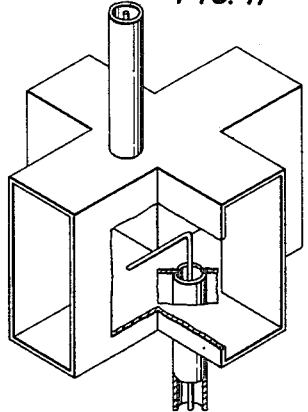

The arrangements for a, b and f are readily visualized by reference to Fig. 7, and for d by reference to Fig. 8. Possible arrangements for c, e and h are shown in Figs. 9, 10 and 11, respectively. The arrangement g is derivable from Fig. 9.

It is appropriate to conclude this discussion of wave guide fundamentals with a discussion of the characteristic impedance of wave guides. There are several definitions according to which the characteristic impedance may be calculated for wave guides. These various calculations lead to expressions which display the same functional dependence upon the dimensions of the guide and upon the frequency; they differ, however, in their numerical constants. The fact that there is ambiguity regarding absolute values of the characteristic impedance is not normally of any importance in practical calculations. That is to say, only relative magnitudes are usually involved, and whenever this is the case, the consistent use of an impedance expression based upon some one definition will lead to the same results as those obtained with respect to another definition.

The characteristic impedance $Z_0$ of guides with circular and rectangular cross section is readily calculated. For the dominant wave in circular guides, $Z_0$ varies with infinity at the critical frequency down to a value of a few hundred ohms for frequencies remote from the critical frequency. For example, with a definition based upon transmitted power and the longitudinal conduction current, $Z_0$ approaches 353 ohms as the frequency is increased. In order to obtain a wide range of impedance values, it becomes necessary to approach the critical frequency to an extent which may often lead to experimental difficulties. For the dominant wave in rectangular guide, however, $Z_0$ possesses not only the same dependence upon frequency, but also a linear dependence upon the dimensions parallel to the electric field. Thus, a wide range of impedance values may be obtained by variation of this dimension. This circumstance may, in certain cases, lead to a preference of rectangular to circular guide. For the rectangular guide, however, it is wise to limit the dimension in the electric plane to values such that the dominant wave cannot be sustained for the polarization perpendicular to the chosen direction.

*One type of wave guide duplex balancer*

Figure 13:
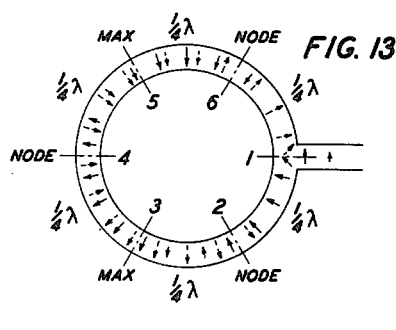
Figs. 13, 14 and 15 are diagrams used for illustrating the operation of the wave coupling arrangement of Fig. 12.

A step-by-step explanation of the construction and operation of one particular form of wave guide duplex balancer in accordance with the invention will be given in connection with Fig. 13. In Fig. 13 there is depicted a closed ring or loop of wave guide, one and one-half wave-lengths in mean circumference, with a straight wave guide connected to it symmetrically, i. e., the axis of the straight guide passes through the center of the ring. The plane of the ring is the electric plane. Fig. 13, then, shows a cross section in the electric plane, and the electric vector for all of the wave guide lies in the plane of the paper. Let it be assumed that a generator is attached to the side arm wave guide so as to send dominant waves toward the ring. Vectors are drawn in Fig. 13 to represent the electric intensity for an instantaneous snapshot with respect to time, with solid and broken vectors for waves which have proceeded to the left and right, respectively, at the junction of the straight guide and ring. The action is similar to that discussed in connection with the branching arrangement of Fig. 2, inasmuch as the waves diverging to the left and right at the junction are 180 degrees out of phase. Due to the fact that the ring contains an odd number of half wave-lengths, the waves which have traversed the ring arrive back at the junction in phase with those entering the ring. Inasmuch as the generator will deliver no power to the ring other than the negligible ohmic losses, the steady state yields essentially a pure standing wave throughout the ring with a voltage maximum at the junction. The behavior with time is readily derived from the instantaneous snapshot of Fig. 13 by allowing the solid and broken vectors to oscillate between oppositely poled limits of equal magnitude. In addition to the voltage maximum at the junction, there will be two other maxima and three voltage nodes, with quarter wavelength spacings as shown.

If openings are cut in the ring at points 2 and 4, and if wave guides are connected symmetrically to the ring at these points, the principles discussed above indicate that these series connections will receive maximum power. If equal loads are placed in these branch wave guides, they will receive equal power. The amplitude of the waves proceeding past 4 toward 3 will equal the amplitude of the waves going past 2 toward 3, since equal powers are being extracted from the waves as they pass by. That part of the ring between points 2 and 4 will still contain, therefore, only a standing wave with a voltage maximum still at the point 3. A series connection to the ring at point 3, for this reason, will receive no power.

Figure 12:
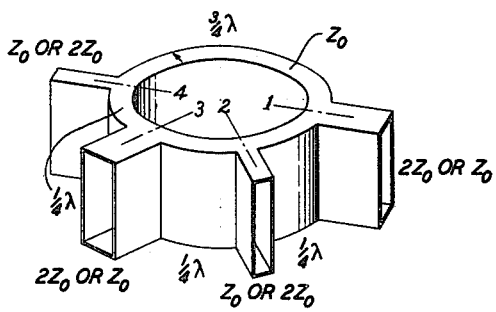
Fig. 12 shows a perspective view of one type of coupling arrangement in accordance with the invention.

Fig. 12 shows a perspective view of such a modified structure, with series connections of the four straight wave guide branches to the wave guide ring at the points 1, 2, 3 and 4.

Let us consider now what happens when a generator is placed in the wave guide arm at the point 2 in Fig. 12. It is apparent that this case may be derived from the preceding one by applying a 60-degree rotation to everything in Fig. 13 except the numbers. Thus, the interference of fields will tend to produce voltage maxima at the points 2, 4 and 6, and voltage nodes at the points 1, 3, and 5 of the ring. If, then equal loads are placed in the branch wave guides 1 and 3, these will receive equal power from the generator associated with the wave guide branch 2, whereas the load in the wave guide branch 4 will receive no power, since that arm is connected at a voltage maximum of a pure standing wave.

Figure 14:
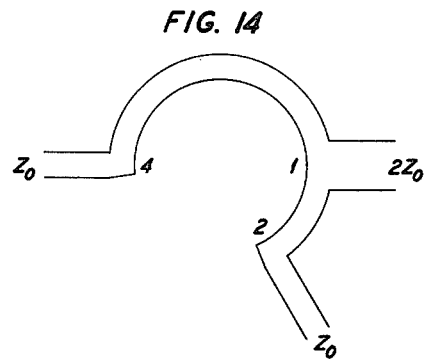

It has been shown that the arrangement of Fig. 12 constitutes an acceptable construction for a wave guide duplex balancer in so far as balance is concerned. It remains to be demonstrated that a set of impedances may be chosen so that impedance matching is accomplished regardless whether the balancer is driven from wave guide branch 1 or from wave guide branch 2. Consider the impedance values shown in Fig. 12. If the characteristic impedance of the wave guide constituting the ring is taken to be $Z_0$, the branches 1 and 3 are built from wave guides having the characteristic impedance of $2Z_0$, while the branches 2 and 4 are of wave guides having a characteristic impedance of $Z_0$. Assume, moreover, that the wave guide branches 2, 3 and 4 are terminated in their characteristic impedances, and that a generator of impedance $2Z_0$, (or an impedanceless generator in series with an impedance $2Z_0$) is attached to wave guide branch 1. Since wave branches 2 and 4 contain equal loads of $Z_0$, no power from the generator will enter the wave guide branch 3. The operation will, in fact, be essentially unaffected by removing that part of the wave guide between the points 2 and 4. This modified arrangement is shown in Fig. 14. It is now clear that each arc of the ring is terminated in characteristic impedance and that the generator of impedance $2Z_0$ is connected to two loads of $Z_0$ in series. Impedances are, therefore, matched to secure maximum delivery of power from the generator.

Figure 15:
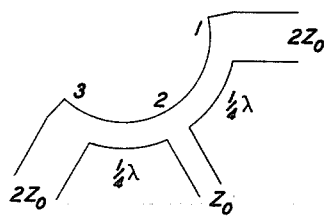

With the impedances of all the branch guides as given in Fig. 12, consider the behavior of the device when the branch guides at points 1, 3 and 4 are terminated in their characteristic impedances, and when a generator of impedance $Z_0$ is connected to the wave guide branch at point 2. Since the load impedances in the branches at points 1 and 3 are equal, the arc 34561 contains only a standing wave and hence may be removed from the ring. The equivalent arrangement is shown in Fig. 15. It must now be recalled that the impedance presented by a quarter wavelength transmission line of characteristic impedance $Z_0$, terminated in impedance $Z$, is $$\frac{Z_0^2}{Z}$$

In this respect wave guides behave in exactly the same way. Each of the $2Z_0$ loads in Fig. 15 appears, therefore, as $\frac{1}{2}Z_0$ at the junction with the wave guide branch 2. Since the generator impedance $Z_0$ is working into two $\frac{1}{2}Z_0$ loads in series, the impedances are matched to obtain maximum efficiency.

Other forms of duplex balancers

A series impedance $Z$ on a transmission line may be replaced by a shunt impedance $$\frac{Z_0^2}{Z}$$

on each side of which is added a quarter wavelength of line. By means of such replacement, the duplex balancer with four series load impedances may be converted into other forms whose load impedances are variously disposed as series and shunt elements. In making the transition from series to shunt loads, however, it may be necessary to remove a half wave-length from some part of the ring in order to preserve the properties of balance. This replacement process yields five different balancers in addition to the one shown in Fig. 12 discussed above. These are shown schematically in Figs. 16 to 20, inclusive, each comprising a closed loop or ring of wave guide, which for the examples shown are 1½ wave-lengths in mean circumference, with four lines, which may be of hollow wave guide or coaxial line as indicated diagrammatically, branching out from the ring at spaced points, the branch lines being connected to the ring either by a series or a parallel connection, the electrical spacing between the lines around the ring in wave-length determined by the type of connections used, as well as the characteristic impedances of the branch lines with respect to the characteristic impedance $Z_0$ of the wave guide ring required to produce impedance matching between the lines being indicated on the figures.

The operation of the devices illustrated in Figs. 16 to 20 may be analyzed by the same method which were used in connection with the alternative device of Fig. 12 discussed above, and it may thereby be shown that each operates to achieve the desired behavior. The six devices shown in Figs. 12 and 16 to 20, inclusive, may be regarded as basic. From each of them, an almost endless number of differently dimensioned duplex balancers may be constructed by application of the following rules:

1. Any integral number of wave-lengths may be added to any arc.
2. Any integral number of half wave-lengths may be added to each of any two arcs.

These rules should be applied in most cases where it is desired to change the angles among the various connections, to simplify the construction or to obtain balancers which conform more readily to available space. It is to be anticipated however, that in general the lengthening of the arcs will decrease the practical range of operating frequencies.

Since the dimensions of all the duplex balancer involves wave-length, it is obvious that any particular construction will be more or less frequency selective. At frequencies other than the "design frequency," the physical dimensions will no longer be exactly correct either to effect the best impedance match or the best balance. An understanding of the band widths available can be obtained from consideration of specific cases.

Figure 18:
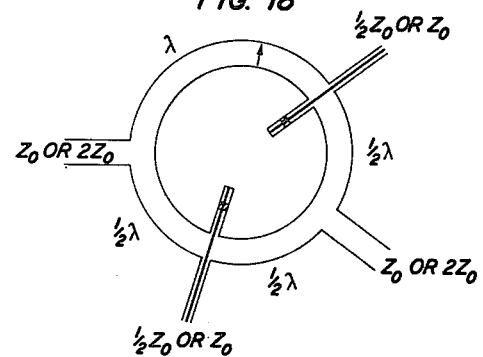
Figure 20:
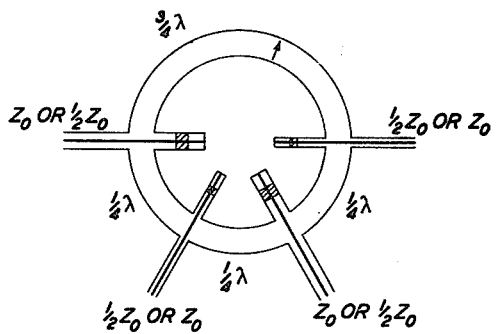
Figure 32:
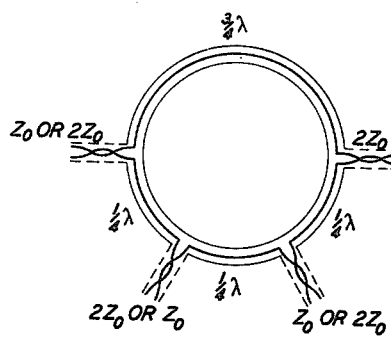
Figure 33:
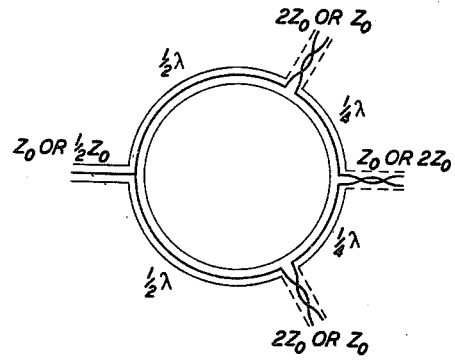
Figure 34:
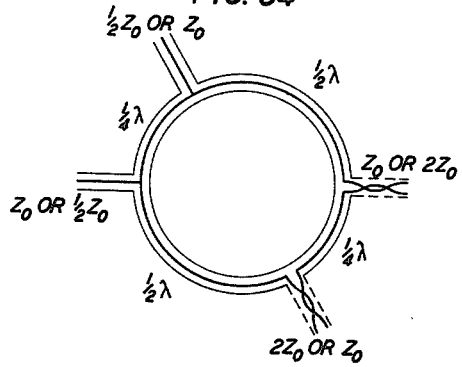
Figure 35:
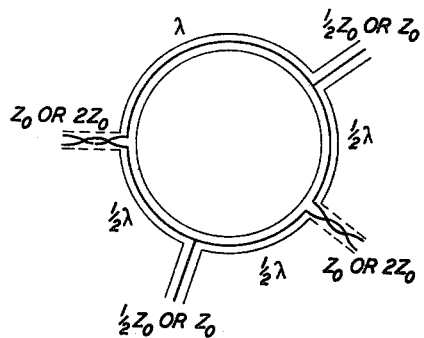
Figure 36:
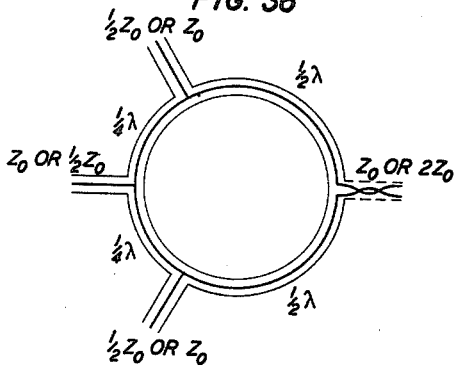
Figure 37:
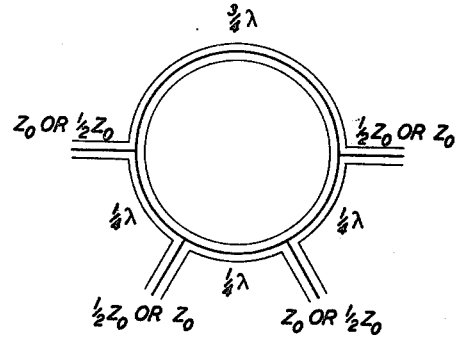
Figure 38:
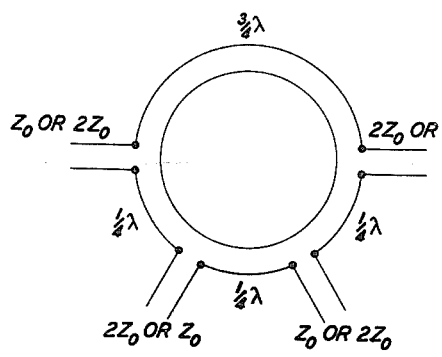
Figure 39:
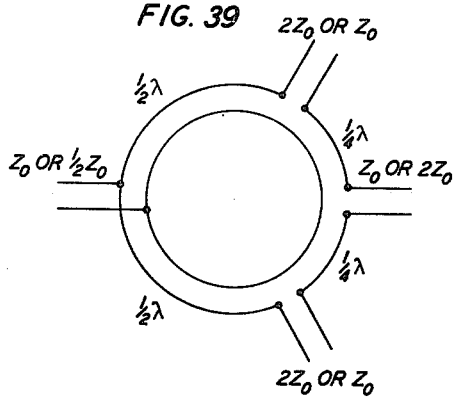
Figure 40:
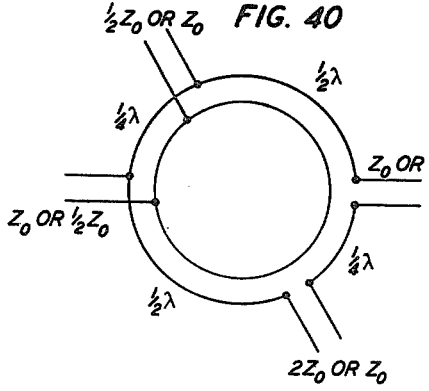
Figure 41:
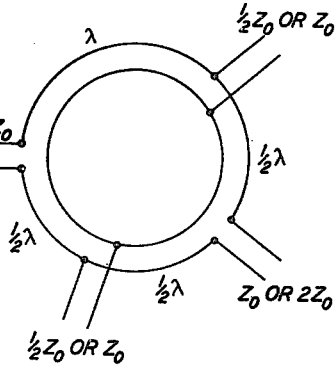
Figure 42:
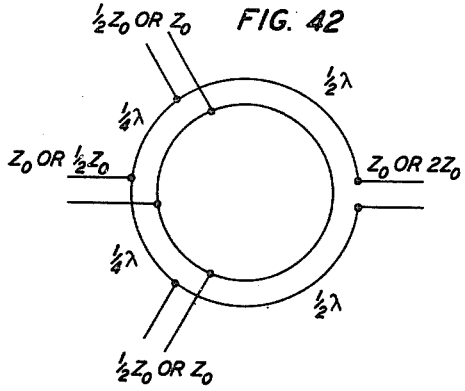
Figure 43:
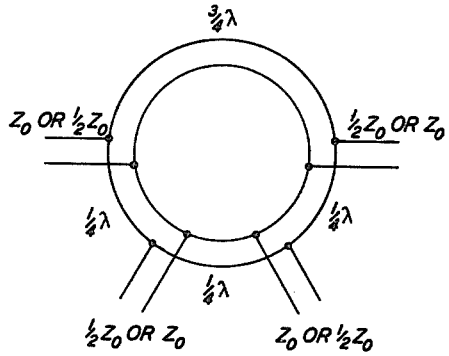
Figure 44:
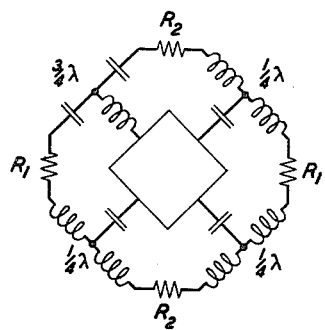
Figure 45:
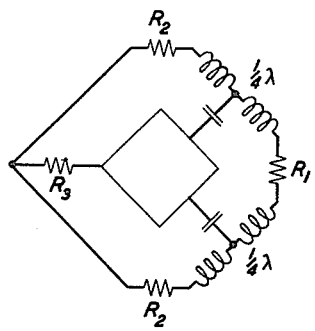
Figure 46:
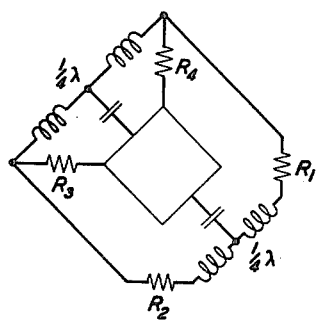
Figure 47:
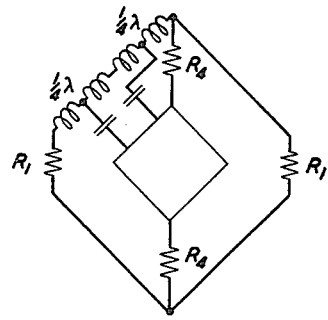
Figure 48:
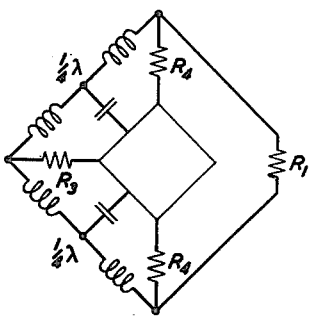
Figure 49:
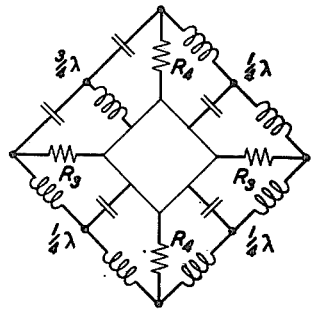

The basic circuits shown in Figs. 12, 18 and 20 achieve balance by providing, between oppositely situated connections of the branching lines, two paths around the ring or loop which differ geometrically by a half wave-length. When a frequency other than the design frequency is employed, these two paths no longer differ by exactly a half wave-length; a perfect balance is not obtained, and the unbalance will increase as the difference between the operating frequency and the design frequency is increased. A particular model of any of these basic circuits cannot, therefore, be made to give perfect balance throughout a band of frequencies. An analysis of similar low frequency circuits suggests that, for small percentage deviations of the design frequency, the extent of unbalance is given approximately by the equation $$\frac{P_{bp}}{P_1} = C\frac{(f-f_0)^2}{(f_0)^2}$$

where $P_{bp}$ equals the power developed in the load at (what should be) the balance point, $P_1$ equals the power developed in those loads which should receive the power, $f$ equals the operating frequency, $f_0$ equals the design frequency and C equals a constant of order of magnitude unity.

For the frequencies which are usually employed with wave guides, the above expression shows that the models of Figs. 12, 18 and 20 may be used in many broad band applications. For example, if there is perfect balance at $f_0=3000$ megacycles, $P_{bp}$ will be about 60 decibels down from $P_1$ at the edges of a 6-megacycle band, and about 40 decibels down from $P_1$ at the edges of a 60-megacycle band.

Figure 16:
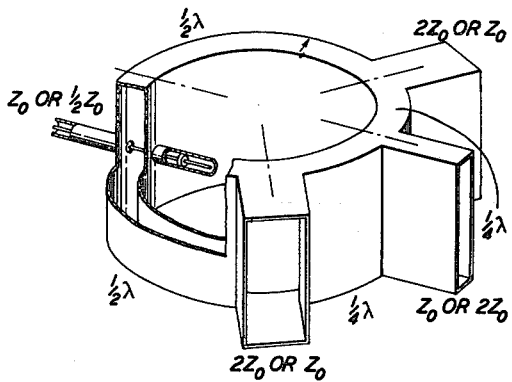
Figure 19:
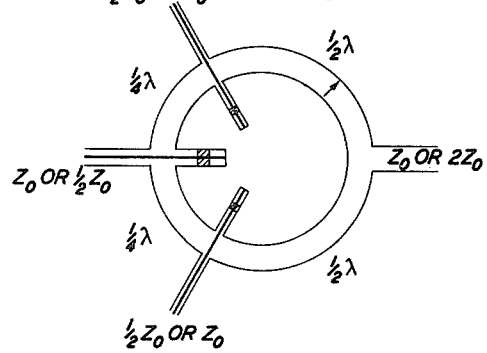

In the basic circuits shown in Figs. 16 and 19, the branch lines entering the ring at points which are geometrically opposite are connected to the ring by a series connection and a parallel connection, respectively. A load placed at either of these geometrically opposite series and parallel connections is balanced with respect to a transmitter placed at the other connection. The proper phasing or balance results not from the use of two paths of different electrical lengths, but from the dissimilarity of the two kinds of connections. In addition, the balance depends upon the equality of the two loads which are receiving the power. The degree of balance obtainable at either of these two points is, therefore, independent of the frequency and dependent only upon the extent to which two loads can be made identical. The degree of balance at the other two branching points will depend upon the frequency according to the approximate mathematical expression given above. The degree of balance at some one point is often the only important criterion, and in many applications, the devices of Figs. 16 and 19 will effectively possess balance over a wide frequency range.

Figure 17:
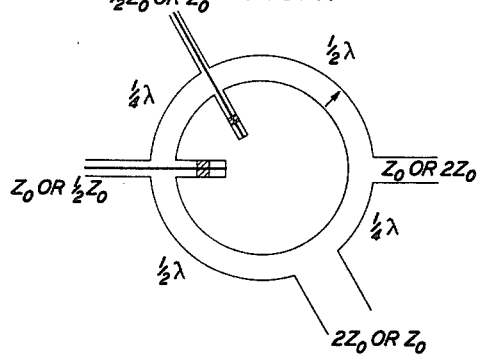

The duplex balancer illustrated in Fig. 17 achieves balance for any point by dissimilarity of oppositely situated connections. In spite of this, the balance is frequency dependent. No matter where a transmitter is connected, a series load and a parallel load are driven. At the design frequency, there are virtual pistons in the ring, one at the series load connection, and one a quarter wave-length behind the parallel load connection. As the frequency is changed, these pistons are displaced unequal distances, and, accordingly, the loads no longer appear identical at the transmitter. Consequently, although two sets of waves arrive 180 degrees out of phase at the balance point, the amplitudes are not exactly equal. There is, however, a partially compensating effect which tends to give this duplex balancer a degree of balance which is more constant with respect to frequency than in the cases of Figs. 12, 18 and 20.

With regard to the frequency dependence of the impedance matching, for all of the basic circuits the perfection of the impedance matching will diminish as the operating frequency departs from the design frequency. The loss which accrues from the impedance mismatch will, however, usually be negligible. For example, if there is a perfect match with the model of Fig. 12 at a frequency of 3000 megacycles, the loss due to mismatch may not be expected to exceed 0.01 decibel at the edges of a 60-megacycle band.

Two rules have been given above which may be applied to increase the size of any of the balancers by adding wave-lengths and half wave-lengths. Another rule may also be stated, namely, that a half wave-length may be subtracted from each of any two arcs. This rule has limited application in that it may be applied only to the basic circuits of Figs. 16, 17, 18 and 19. Condensed circuits derived from the circuits of Figs. 16, 17 and 19 by applying the latter rule are shown schematically in Figs. 21, 22 and 23, respectively; the circuits of Figs. 24 to 28 are all derived from Fig. 18, the first four by removing in various ways one pair of half wave-lengths, the last, Fig. 28, by subtracting two pairs of half wave-lengths. With all of the condensed circuits, the necessity for superposed connections arises. The superposed connections illustrated diagrammatically make use of the branching schemes of Figs. 7 to 11. It is to be understood that the arrangements of Figs. 21 to 28 represent only one particular construction for each condensed duplex balancer. Alternative methods for obtaining the desired superposed connections may, of course, be employed to provide other particular arrangements which, for certain applications, may be superior to those chosen for illustration. It has already been indicated that some of the superposed connections to a wave guide may yield in practice considerable deviations from simply superposed connections. It is possible, then, that some of the condensed forms of duplex balances to be made workable will require extensive reactance tuning (not shown).

As with the arrangements of Figs. 16 and 19, the oppositely situated branch lines with series and parallel connections in the arrangements of Figs. 21 and 23 should display a balance which depends only upon the extent to which two loads can be made identical. The frequency dependence of balance in the remaining condensed models will be less severe than in their prototypes, but will be essentially the same in character. It is, moreover, to be expected that all of the condensed circuits should show better impedance matching over a given band of frequencies. For these reasons, the arrangements of Figs. 21 to 28 may be of most utility in wave guide systems where compactness and broad frequency response are essential. In other applications, of course, a lengthening of the arcs may be preferable to facilitate mechanical construction.

Among the experimental models of duplex balancers which have been built and tested are those of Figs. 12, 21, 29, and 30. Fig. 31 shows the actual construction used for the balancer indicated schematically in Fig. 21. Figs. 29 and 30 differ from Figs. 12 and 17, respectively, merely by the addition of an integral number of wave-lengths to certain of the arcs in accordance with the first rule given above. It was found that these models worked out exactly as predicted from the simple assumptions, it not being necessary to apply any considerable correction factor to the initial design to take care of distortion of the electromagnetic fields caused by guide curvature and sharp bends, as might have been expected.

It has been found that, with any of the experimental models, the power developed at a balance point was 45 decibels or probably more below the power which was being sent into the ring. Such a balance is, moreover, obtainable over a relatively wide range of frequencies; the impedance mismatch, however, varies throughout this range. The reason for these results is that, except in a relatively narrow band of frequencies centered about the "design frequency," i. e., the optimum frequency, some reactance tuning is necessary in order to achieve balance by proper phasing. This reactance tuning, however, changes the impedance of the duplex balancer as viewed from any series or parallel connection, and thus the device will no longer match the impedance of the line to which it is attached.

By reactance tuning is meant either the introduction into one or more of the arms of the balancer, of suitable devices which present adjustable reactances in shunt with the resistive loads, or the deliberate detuning of the load itself so as to present a reactive component in the load impedance. It is of the greatest importance that reactance tuning has been experimentally found to be feasible and that, due to impedance mismatch, the insertion loss need not exceed a few per cent of the power over a wide range of frequencies.

It is to be noted that the experimental models illustrated in Figs. 12, 29, 30 and 31 constitute representative samples of the various theoretical circuits. In view of the excellent performance of each of these practical constructions, the problem of refining the design in order to improve the degree of balance and to reduce the insertion loss is not considered a difficult one. This would, in fact, seem to be merely a design problem, best solved only in reference to particular sizes and shapes of wave guide and particular wave-length ranges.

*Duplex balancers employing other types of transmission line*

The general principles upon which depends the operation of the duplex balancers described above are not peculiar to wave guides alone, and so the basic circuits shown in Figs. 12 and 16 to 20 may be redrawn for the employment of any type of ordinary "return path" transmission line, such as coaxial cable or shielded pair cable (parallel wire lines), or of any suitable combination of these with each other and with wave guides. In specifying a basic duplex balancer circuit for each type of transmission line and for each combination of types, care must be exercised to provide the proper line and load impedances and to establish a series or parallel connection where each is required.

It is to be noted that certain combinations of different types of transmission lines with each other and with wave guides are more tractable than other combinations. For example, coaxial cable is more readily used with wave guides than is a shielded pair (parallel wire) line; this is true with regard both to the mechanics of making series and parallel connections and to the difficulty of obtaining electrical symmetry and impedance match. Also, it may not be assumed that in general a given type of line can be readily used throughout the entire duplex balancer. For example, a series connection with coaxial cable is much more readily established from a shielded pair than from another coaxial cable. It is probably desirable in most cases, however, to use only one kind of line in constructing the "ring" part of the balancer.

Those combinations of wave guides and transmission lines which constitute the most practical construction are listed below:

| Ring Composed of— | Series Connections Most Readily Made with— | Parallel Connections Most Readily Made with— |
|---|---|---|
| Wave Guide | Wave Guide | Coaxial Cable. |
| Coaxial Cable | Shielded Pair | Do. |
| Shielded Pair | do | Shielded Pair. |

It will be noted that in the duplex balancers o the invention using a wave guide ring such a shown in Figs. 12 and 16 to 28, the branch line connected to the ring by parallel connections hav been shown as coaxial lines, as the use of wav guides for the parallel connections is probably im practical unless the ring comprises many hal wave-lengths, i. e., has a large radius of curvature or unless the ring is distorted so as to possess on or more straight portions.

The basic circuits for a ring of coaxial cabl are shown in Figs. 32 to 37, and for a ring o shielded pair line in Figs. 38 to 43. Only th branch line connections such as listed in the tabl are shown. As shown, the impedance values an dimensions are the same for the coaxial cable du plex balancers of Figs. 32 to 37 and the shielde wire line balancers of Figs. 38 to 43 as for the cor responding balancers using a ring of wave guid shown in Figs. 12 and 16 to 20. The condensa tions (from the basic circuits of Figs. 16 to 19 shown in Figs. 21 to 28 are, of course, applicabl to the duplex balancers of Figs. 32 to 43.

*Lumped constant duplex balancers*

A section of transmission line of any length ma be represented for any particular operating fre quency by a symmetrical T or π network wit lumped circuit constants, and the values of th impedances necessary for the representation ar well known. In order to translate the transmis sion line duplex balancers described above int duplex balancers using circuits of lumped con stants, i. e., coils, condensers and resistors, it i necessary only to substitute the appropriat lumped constant T- and π-sections for half wave length, quarter wave-length and three-quarte wave-length sections of transmission line used i the ring or loop between the branch lines in th previously described balancers. In order to rep resent the dissipation of actual lines, a series re sistance is usually added in each arm of any c the T- and π-networks. Coils and condenser however, always possess dissipation too, so tha it is most convenient for present purposes to as sume that the losses in the coils and condenser are so adjusted that a given dissipative line is trul represented.

The representation of quarter and three-quar ter wave-length sections of circuits with lumpe constants is straight-forward; there is, to be sur ambiguity in the signs of the reactances, but i each case this is readily resolved by an analys of the current. The case of a half wave-lengt section is not so simple. The analytical solutio based upon impedances leads to nothing but pair of wires; analysis based upon currents, how ever, shows that these wires must be crosse Nevertheless, even crossed wires cannot be use freely as a substitute for a half wave-length sec tion. In general, crossed wires are completely ir adequate to represent the behavior of a half wav length section with respect to frequency. In tl present case, moreover, the lumped constant dι plex balancer derived from the arrangement Fig. 18 by using three pairs of crossed wires w not give any balance whatsoever. Care mu therefore be exercised in the representation half wave-length sections. It has been found th two lumped constant T- or π-sections in serie each equivalent to a quarter or three-quart wave-length section, will give an adequate repr sentation in those cases where crossed wires fa It can be shown, moreover, that the network re resentation of quarter and three-quarter wav length sections displays, for small deviations from the given frequency, the correct functional variation, differing from the transmission line expression only by numerical constants of order of magnitude unity.

By utilizing symmetrical T- or $\pi$-electrical networks or combinations of them, of proper equivalent wave-length, in place of the corresponding lengths of wave guide in the wave guide duplex balancers shown in Figs. 12 and 16 to 20, a large number of lumped constant duplex balancers can be derived. This number can be still further increased by applying the rule that the lumped constant representation of a half wave-length may be added to each of any two arcs. For illustrative purposes the circuit diagrams of six of such lumped constant duplex balancers, respectively derived from those of Figs. 12 and 16 to 20, are shown in Figs. 44 to 49.

Applications of duplex balancers

Figure 50:
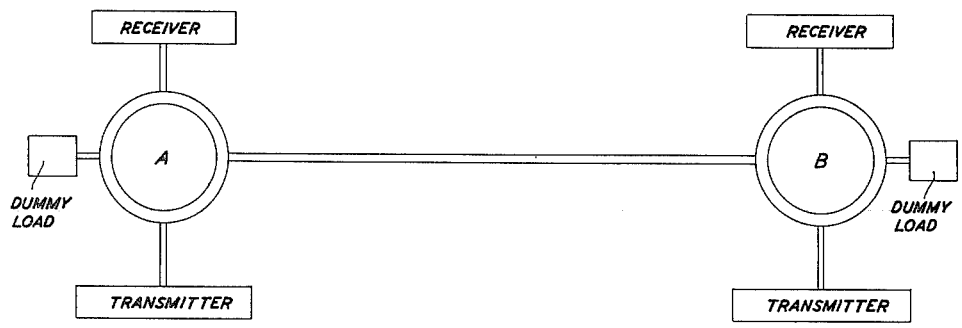

As stated above, the duplex balancers of the invention are of primary utility for duplex communication, for it renders possible simultaneous two-way communication at the same frequency. In order to communicate between two stations A and B either (a) transmission lines, or (b) an air path for radio, may be used to link the stations. In both cases, the duplex balancer may be used to great advantage. In Fig. 50, a schematic diagram is shown for the transmission line case. Here, the use of a duplex balancer of any of the above described types (shown diagrammatically in Fig. 50 and succeeding figures), with the receiver located in an arm which is balanced with respect to the transmitter, permits simultaneous transmission and reception at each station with only one line between A and B. For transmission, there is a 3-decibel loss from dissipation in the dummy load and for reception there is a 3-decibel loss in the transmitter. The over-all loss of 6 decibels may, in some cases, be unimportant compared with the economy effected in halving the amount of transmission line required; in other cases, the single line itself may be improved so as to offset the 6-decibel loss, with a net economy in space and cost, or both.

Figure 51:
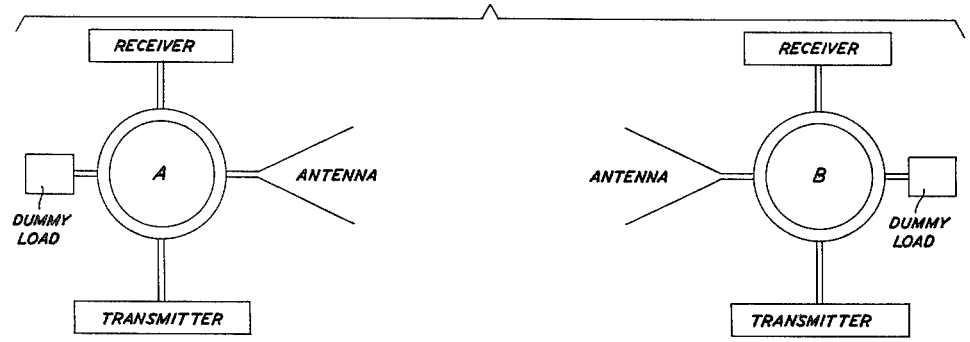

In Fig. 51, a schematic diagram is given for the case of communication by radio via an air path. The presence of a duplex balancer in each station A and B allows a single antenna or radiating system, indicated diagrammatically, to be used for simultaneous reception and transmission. As in the case of Fig. 50, there is an over-all loss of 6 decibels for communication in either direction. In directive systems, however, the space available for the radiator is often limited. The use of a duplex balancer permits all the space to be used for both transmission and reception thereby introducing a gain of 3 decibels for each process. The power levels for the arrangement of Fig. 51 with one "double-size" radiating system are the same, therefore, as for a system with two separate, single-size antennas for reception and transmission.

In its simplest form, an object location system consists of a transmitter driving a directive antenna, whereby short or ultra-short radio waves are sent out, and a receiver connected to a nearby directive antenna, whereby the waves reflected from an object are received. Fig. 52 shows diagrammatically how a duplex balancer in accordance with the invention may be used for object location with a single radiator. The over-all loss of 6 decibels may be exactly compensated by doubling the "size" of the radiator (in the case of a horn, the aperture). Such a double-size radiator, however, possesses a considerably greater "angular directivity" than a single-size radiator, and such increased angular resolution is often much to be desired. Hence the arrangement of Fig. 52 may be found to give improved efficiency for many purposes of object location.

It would seem that the over-all loss of 6 decibels cannot be avoided in duplexing, as long as passive transmission elements are used. However, it can be anticipated that for some cases of duplex transmission, the circuit elements will be sharply pulsed, with the transmitter in a quiescent state between pulses. Such a situation lends itself to the use of active circuit elements, whereby other arrangements may be devised to eliminate the 6-decibel loss incidental to the present duplex balancers. It is to be noted, however, that the duplex balancer with active elements in transmitter and dummy arms would show an over-all loss of only about 3 decibels.

In connection with problems of object location, the question arises as to what polarization shall be used for transmission and reception. Linearly polarized waves are the simplest to employ, but cases may arise in which the angle of polarization is most unfortunately chosen with respect to some objects in certain positions, whereby the amount of reflected power is too small to be detected. It is clear, however, that the use of circularly polarized waves avoids any such difficulties.

Should it be desired to use circular polarization, it is important to know whether a wave guide duplex balancer is readily available. Examination of the duplex balancers of Figs. 12 and 20 shows that the dimensions are identical. It is to be recalled that branching in the electric plane simulates a series connection and in the magnetic plane, a parallel connection. If, therefore, the circuit of Fig. 12 is constructed with circular wave guide for the ring and for all the branching arms, the result is a balancer like that of Fig. 12 for linearly polarized waves with electric intensity in the plane of the paper, and like Fig. 20 for linear polarization at right angles to the paper. Since the circuit behaves properly for both polarizations, it constitutes a duplex balancer for circular or elliptic polarization. Care must be exercised, however, to provide the proper impedances separately for the two perpendicular components, but this should not be difficult, especially if the two components are received separately to provide a polarization diversity system. Even if all impedances remain equal to $Z_0$, however, the loss due to impedance mismatch would not exceed one decibel.

From conventional telephone practice it is known that by the use of devices which function in a manner similar to that of a hybrid coil, the construction of a two-way repeater is a straightforward matter. Two of the duplex balancers of the invention can be used, therefore, in conjunction with two amplifiers to form a duplex repeater. Fig. 53 shows schematically such a repeater for wave guides, utilizing velocity variation wave guide amplifiers. It is characteristic of these amplifiers that the feedback between the final (output) gap and the preceding gap is very small. From this it follows that the feedback of this repeater as a whole is very small.

Fig. 54 shows a way in which three duplex balancers of any type in accordance with the invention as described above (shown in the figure diagrammatically) may be directly connected to form what may be called a "multiple duplex balancer." This would be of great use in the case where it is desired to transmit simultaneously from a station 0 to four stations A, B, C, D and to receive simultaneously at station 0 from station A or B and C or D. Larger numbers of duplex balancers may be directly connected in a similar manner in order to link a greater number of stations, e. g., seven balancers may be used for a central station and eight substations. In such an application, there is no loss in transmission and no more than 3-decibel loss in the reception; the use of "double-size" radiators or lines will, therefore, lead to a net gain of 3 decibels for such arrangements.

It may be stated in general that the duplex balancers of the invention can be used profitably in most situations where it is desired to separate signals of the same frequency traveling in opposite directions on the same line or by the same air path. The 6-decibel over-all loss nominally incidental to such methods of duplexing must be incurred and tolerated, although, as has been mentioned above, this loss may often be reduced or eliminated by changes elsewhere in the equipment.

It will be noted that in the foregoing description of the duplex balancers of the invention, an equal power division has been selected for the two loads which are driven. If the devices are constructed according to the above specifications, the equal power division is necessary in order to secure a balance. With suitable modifications, however, a balance can be obtained without equal power division. If situations arise which are best satisfied by a balancer with unequal power division, the duplex balancers already described must be modified by reactance tuning within the ring or by the use of a ring composed of two or more arcs of transmission line, possibly of different type or of different characteristic impedance, suitably coupled.

In the general case, then, one load may receive $p$ per cent of the transmitted power, the other load receiving $(100-p)$ per cent. With passive circuit elements, reciprocity requires that if the transmitter (signal generator) is connected in place of the first load, $p$ per cent of its transmitted power must be delivered to a suitable load located at the original transmitting point. Inasmuch as the product $p(100-p)$ is a maximum for $p=50$ per cent, it is seen that the case of equal power division possesses the highest duplex efficiency. In view of this efficiency consideration and in view of the fact that an unequal power division would entail considerable added complexity in the construction and operation of the device, the case of equal power division will normally be preferred, and has, accordingly, been selected for sole consideration in the preceding discussion.

Various modifications of the devices of the invention and applications thereof other than those which have been illustrated and described, which are within the spirit and scope of the invention, will occur to persons skilled in the art.

What is claimed is:

1. A device for enabling efficient transmission of wave power between certain and for substantially preventing transmission of wave power between others of four transmission circuits comprising an intermediate coupling consisting of another transmission circuit forming a closed transmission loop, means for connecting two of said four transmission circuits symmetrically to geometrically opposite points of the looped circuit, by a series and a parallel electrical connection, respectively, so as to electrically balance one of said two circuits against the other at a given wave frequency, means for symmetrically connecting the other two of said four transmission circuits respectively to opposite sides of the looped circuit at intermediate points so spaced electrically from said geometrically opposite points thereof as to provide the maximum amount of unbalance between each of said other two circuits and each of the first two of said four circuits, the characteristic impedances of said four circuits being proportioned with respect to the characteristic impedance of said looped circuit to provide the optimum impedance matching between said four circuits at said given wave frequency.

2. In combination, a transmission line connected in a closed loop and four other transmission lines branching symmetrically from the looped line in the plane thereof, two of the branch lines being connected at geometrically opposite points of said loop electrically in series and in parallel, respectively, with the looped line, and the other two branch lines being respectively connected electrically in series with opposite portions of the looped line $(\frac{1}{4}+\frac{1}{2}n_1+n_2)$ wave lengths, and $(\frac{1}{2}+\frac{1}{2}n_1+n_3)$ wave-lengths from the first series-connected branch line and the parallel-connected branch line, respectively where each of the constants $n_1$, $n_2$ and $n_3$ may be equal to zero or any integer.

3. In combination in a wave transmission system, a coupling device comprising a transmission line connected in a closed ring and four transmission lines branching out symmetrical from said ring in the plane thereof, two of the four branch lines being connected to the ring points therein which are geometrically opposite by a series and a parallel electrical connection, respectively, and the other two branch lines being connected to intermediate opposite portions of the ring by the identical type of electrical connection which may be either series or parallel said four branch lines being so spaced as to create arcs between them around the ring which between an adjacent parallel-connected and series-connected line is one-half wave-length and between two adjacent parallel-connected lines or two adjacent series-connected lines one-quarter wave-length, or such spacing with the addition of any integral number of wave lengths to any arc or with a half wave-length subtracted from each of any two arcs.

4. In combination, a transmission line connected in a closed loop, one and one-half wave lengths in electrical length, and four other transmission lines branching symmetrically from the looped line in the plane thereof, two of the branch lines being connected at geometrically opposite points of said loop electrically in series and parallel, respectively, with the looped line, and the other two branch lines being respectively connected electrically in series with opposite portions of the looped line one-quarter wave-length and one-half wave-length from the first series connected branch line and said parallel-connected branch line, respectively.

5. The combination of claim 2, in which characteristic impedances of said four branch transmission lines connected to said looped line are alternately $Z_0$ and $2Z_0$, where $Z_0$ is the characteristic impedance of said looped line.

6. In combination in a wave transmission system, a closed ring of hollow metal wave guide and one-half wave-lengths in mean circumference ence, the plane of the ring containing the electric vector of the dominant wave to be propagated therethrough, three straight hollow metal wave guides and one coaxial line branching out symmetrically from the ring in the plane thereof, the coaxial line branch being connected electrically in parallel with the ring and the three wave guide branches being connected electrically in series therewith, the spacing between the axis of said coaxial line branch and the axis of each of the next adjacent wave guide branches along the mean circumference of said ring being one-half wave-length, and the spacing between the axes of each two adjacent wave guide branches along said mean circumference being one-quarter wave-length.

7. In combination in a wave transmission system, a closed ring of hollow metal wave guide, the plane of the ring containing the electrical vector of the dominant wave to be propagated therethrough, three straight hollow metal wave guides and one coaxial line branching out symmetrically from the ring at spaced points in the plane perpendicular to its axis, the coaxial line branch being connected to the wave guide ring in the magnetic plane and the three wave guide branches being connected to the wave guide ring in the electric plane, the electrical spacing between the axis of said coaxial line branch and the axis of each of the next adjacent wave guide branches along the mean circumference of said ring being $(\frac{1}{2}+\frac{1}{2}n_1+n_3)$ wave-lengths, and the electrical spacing between the axes of each two adjacent wave guide branches along said mean circumference being $(\frac{1}{4}+\frac{1}{2}n_1+n_2)$ wave-lengths, where each of the constants $n_1$, $n_2$ and $n_3$ is equal to zero or any integer.

8. In combination, a transmission line connected in a closed loop and four other transmission lines branching out symmetrically from said loop in the plane thereof, two of the branch lines being connected at geometrically opposite points of said loop in series and in parallel, respectively, with opposite portions of the looped line, the other two of said branch lines being respectively connected in parallel with intermediate opposite portions of the looped line $(\frac{1}{4}+n)$ and $(\frac{1}{2}+n)$ wave-lengths, respectively, along said loop from said parallel-connected branch line and said series-connected branch line, where $n$ is zero or any integer.

9. In combination, a transmission line connected in a closed loop one and one-half wavelengths in electrical length, and four other transmission lines branching out symmetrically from the looped line, two of the branch lines being connected at geometrically opposite points of said loop in series and in parallel, respectively, with the looped line, the other two branch lines being connected electrically in parallel with opposite intermediate portions of the looped line, one-quarter wave-length and one-half wave-length along said loop from said parallel-connected branch line and said series-connected branch line, respectively.

10. The combination of claim 9, in which the characteristic impedance of said series-connected branch line is $Z_0$, that of the geometrically opposite parallel-connected branch $Z_0$, and that of each of the other two parallel-connected branch lines is $\frac{1}{2}Z_0$, or alternatively the characteristic impedance of the first two lines is $2Z_0$ and $\frac{1}{2}Z_0$ respectively, and that of the latter two branch lines is $Z_0$, where $Z_0$ is the characteristic impedance of said looped line.

11. In combination, a transmission line connected in a closed loop and four other transmission lines branching out symmetrically at spaced points from said loop in the plane thereof, each two oppositely situated branch lines being connected electrically to the loop by a series and a parallel connection, respectively, the electrical spacing between adjacent branch lines around the loop being alternately $(\frac{1}{4}+\frac{1}{2}n_1+n_2)$ and $(\frac{1}{2}+\frac{1}{2}n_1+n_3)$ wave-lengths, where each of the constants $n_1$, $n_2$ and $n_3$ equals zero or is any integer.

12. The combination of claim 11, in which the characteristic impedances of the two parallel-connected branch lines are respectively $Z_0$ and $\frac{1}{2}Z_0$ and those of the two series-connected branch lines are $Z_0$ and $2Z_0$, respectively, where $Z_0$ is the characteristic impedance of the looped line.

13. In combination, a ring of hollow metal wave guide and four transmission lines branching out from said ring at different points, two adjacent ones of said lines being connected electrically in series with said ring and the other two adjacent lines being connected electrically in parallel therewith, the electrical spacings around said ring between the two series-connected branch lines and between the two parallel-connected branch lines being $(\frac{1}{4}+\frac{1}{2}n_1+n_2)$ wavelengths and between each series-connected branch line and the adjacent parallel-connected branch line being $(\frac{1}{2}+\frac{1}{2}n_1+n_3)$ wave-lengths of the design frequency, where each of the constants $n_1$, $n_2$ and $n_3$ is equal to zero or any integer.

WARREN A. TYRRELL.

REFERENCES CITED

The following references are of record in the file of this patent:

UNITED STATES PATENTS

| Number | Name | Date |
|---|---|---|
| 2,416,790 | Barrow | Mar. 4, 1947 |
| 2,424,156 | Espley | July 15, 1947 |

FOREIGN PATENTS

| Number | Country | Date |
|---|---|---|
| 491,359 | Great Britain | Aug. 31, 1938 |